(12) United States Patent
Sugano

(10) Patent No.: US 6,485,287 B1
(45) Date of Patent: Nov. 26, 2002

(54) NOODLE-MAKING MACHINE

(76) Inventor: Eiji Sugano, 9-28-1, Shiomi, Abashiri-city, Hokkai-do (JP)

( * ) Notice: Subject to any disclaimer, the term of this patent is extended or adjusted under 35 U.S.C. 154(b) by 0 days.

(21) Appl. No.: 09/500,161

(22) Filed: Feb. 8, 2000

(30) Foreign Application Priority Data

Jul. 26, 1999 (JP) .......................................... 11-210726

(51) Int. Cl.⁷ .............................................. B29C 47/60
(52) U.S. Cl. ........................ 425/205; 425/208; 425/464
(58) Field of Search ................................. 425/204, 205, 425/382.2, 208, 192 S, 464; 426/516, 448, 504

(56) References Cited

U.S. PATENT DOCUMENTS

| | | | | |
|---|---|---|---|---|
| 1,353,917 A | * | 9/1920 | Lambert .................. | 425/376.1 |
| 3,829,594 A | * | 8/1974 | Schweizer, Jr. ............. | 426/516 |
| 4,384,837 A | * | 5/1983 | Murai et al. ................. | 425/202 |
| 4,422,372 A | * | 12/1983 | Hoezee ........................ | 99/353 |
| 4,632,795 A | * | 12/1986 | Huber et al. ................. | 264/115 |
| 5,244,373 A | * | 9/1993 | Capelle et al. .............. | 425/208 |
| 5,302,102 A | * | 4/1994 | Haimer ........................ | 425/135 |
| 5,694,833 A | * | 12/1997 | Wenger ........................ | 99/348 |

* cited by examiner

Primary Examiner—Jan H. Silbaugh
Assistant Examiner—Joseph S Del Sole
(74) Attorney, Agent, or Firm—Anderson Kill & Olick; Eugene Lieberstein; Michael N. Meller

(57) ABSTRACT

A noodle-making machine comprises a motor, a cylindrical casing, a screw disposed rotatably inside the cylindrical casing, a perforated nozzle plate provided at an end of the cylindrical casing, and a hopper attached to the casing. A groove is formed inside one end of the casing. The nozzle plate has a recess portion formed therein. A coupling formed of female and male coupling members is provided to connect the motor to the screw.

5 Claims, 6 Drawing Sheets

Fig.4(a)
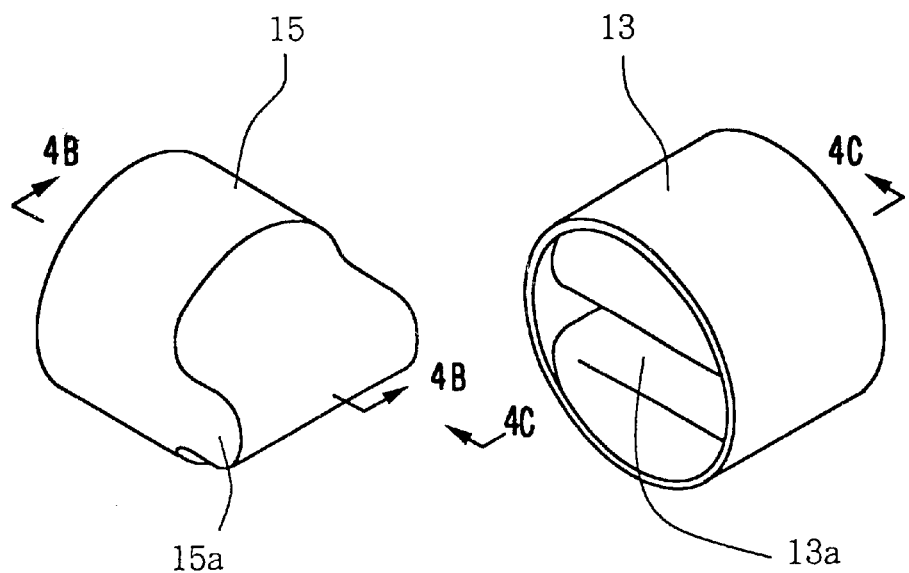
Fig.4(b)      Fig.4(c)
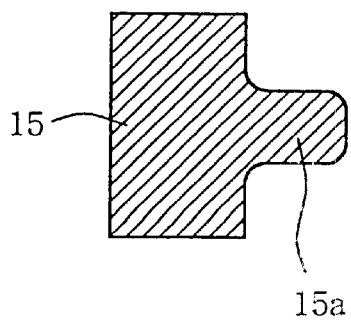
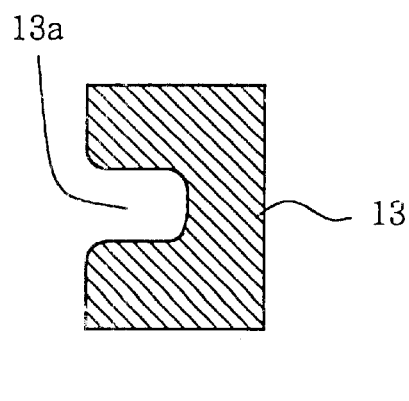

NOODLE-MAKING MACHINE

BACKGROUND OF THE INVENTION

1. Field of the Invention

The present invention relates to an extrusion type machine for making soba (buckwheat noodles), udon (wheat-flour noodles), spaghetti and other such noodles, and more particularly to a machine for making soba.

2. Description of the Prior Art

FIG. 5 shows a conventional noodle-making machine. With reference to the drawing, a noodle-making machine 1 comprises a motor 3 and a cylindrical casing 4 disposed in a frame 2, and a hopper 5 attached to the top of the frame 2. The motor 3 is supported horizontally on a base 6 affixed inside the frame 2. A motor coupling portion 7 projects from the opposite side of the base 6. Inside the cylindrical casing 4 is disposed a screw 8. A coupling portion 9 has a cavity into which a projecting portion of the motor coupling portion 7 fits. When the coupling portions are thus fitted together, they are held together by a pin 10 that is inserted into a through-hole formed in the coupling portions 7 and 9 in their engaged state, so that rotation of the motor 3 also rotates the screw 8. The part of the screw 8 positioned below the hopper 5 has a large thread pitch, with the pitch becoming finer going towards the end.

The cylindrical casing 4 is formed with a slight flare toward the end thereof. At the end of the casing 4 is a round nozzle plate 11. The nozzle plate 11 has numerous small through-holes 11a formed therein, and is detachably attached to the cylindrical casing 4 by means of screws. Formed in the wall of the cylindrical casing 4 is an opening 4a into which the lower end of the hopper 5 is attached.

To make soba or udon, first a suitable quantity of water is added to the soba or udon flour to form a starting material mixture that is loaded into the hopper 5. The screw 8 is then turned, causing the mixture to be moved toward the nozzle plate 11. As the mixture is not yet kneaded, it is still in a runny state and therefore does not pass through the through-holes 11a. It is the rotation of the screw 8 that performs the kneading. When the mixture has thus been sufficiently kneaded to thicken it, it starts to be forced out through the through-holes 11a, thereby forming strings of soba or udon noodles.

With such a noodle-making machine, kneading the mixture requires the application of a fairly considerable pressure. If the pressure is too high, the temperature of the mix becomes elevated, converting the starch of the starting material into soluble starch. The machine is also subjected to the reactive force of the pressure applied to the mix, which can result in the failure of the pin 10 inserted through the coupling between the motor shaft and the screw shaft. Another drawback is that if the kneading time is too short the soba noodles readily break during boiling, while if the kneading time is too long the soba loses its unique taste and forms a state akin to udon.

An object of the present invention is to provide a noodle-making machine that enables the pressure applied during kneading to be properly adjusted and in which a high kneading pressure does not result in failure of joint portions.

SUMMARY OF THE INVENTION

To achieve the above object, the present invention provides a noodle-making machine comprising a cylindrical casing, a screw disposed rotatably inside the cylindrical casing, a nozzle plate provided at an end of the cylindrical casing, said nozzle plate having formed therein numerous small holes, and a hopper attached to the casing, wherein a groove is formed in an inner surface at the end of the casing perpendicularly to the screw.

The groove may also be formed as a spiral groove with the spiral winding in the opposite direction to the spiral of the screw.

In accordance with another aspect of the invention, a noodle-making machine is provided comprising a cylindrical casing, a screw disposed rotatably inside the cylindrical casing, a nozzle plate provided at an end of the cylindrical casing, said nozzle plate having formed therein numerous small holes, a hopper attached to the casing, a motor that drives the screw, and a coupling that connects the screw and the motor, said coupling comprising a recessed female portion on one side and a projecting male portion on the other side that fits snugly into the female portion.

It is preferable that the recess of the female portion and the projection of the male portion each be formed in a straight line extending diametrically with respect to the screw and motor, and that the nozzle plate be detachably attachable to the cylindrical casing. Also, the noodle-making machine in which the groove is thus formed may be configured with a recess formed in the surface of the nozzle plate that faces the screw, with a groove formed in the casing, and with a coupling comprising male and female type coupling members with the female side of the coupling being on either of the screw or the motor, and the male side of the coupling being on whichever of the screw and the motor does not have the female side of the coupling provided thereon.

Moreover, the cylindrical casing in which the screw is rotatably disposed may be arranged horizontally and the drive means used to rotate the screw arranged perpendicularly in a configuration that turns the rotation of the drive means through 90 degrees for transmission to the screw, and with the nozzle plate disposed above, away from the plane on which the apparatus is provided.

Further features of the invention, its nature and various advantages will be more apparent from the accompanying drawings and following detailed description of the invention.

BRIEF DESCRIPTION OF THE DRAWINGS

FIG. 4(*a*) is a disassembled perspective view of the coupling, (b) is a sectional view along line C—C of (a), and (c) is a sectional view along line D—D of (a).

DESCRIPTION OF THE PREFERRED EMBODIMENT

Figure 1:
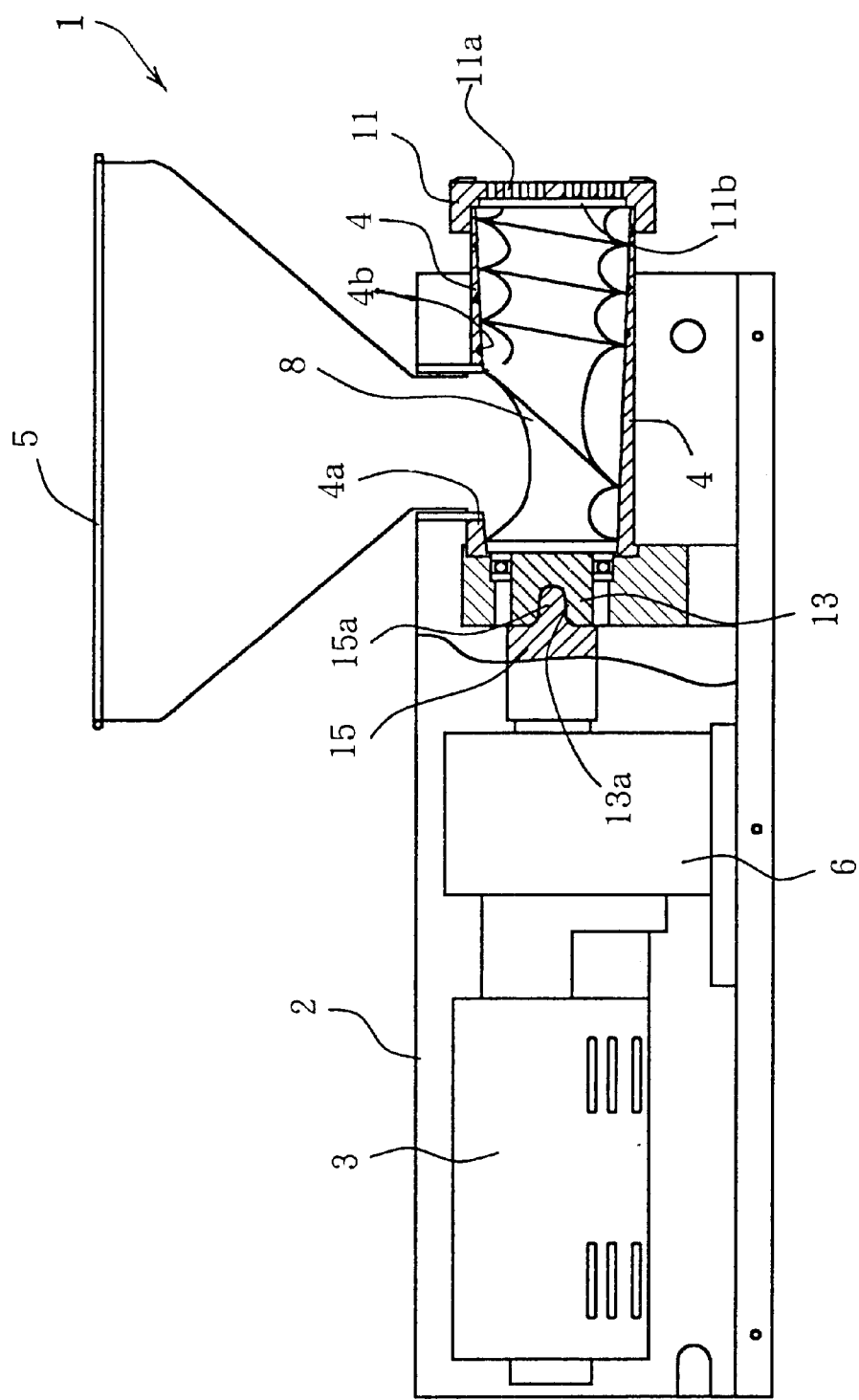
FIG. 1 is a partial cutaway front view of the noodle-making machine of the invention.
Figure 2A:
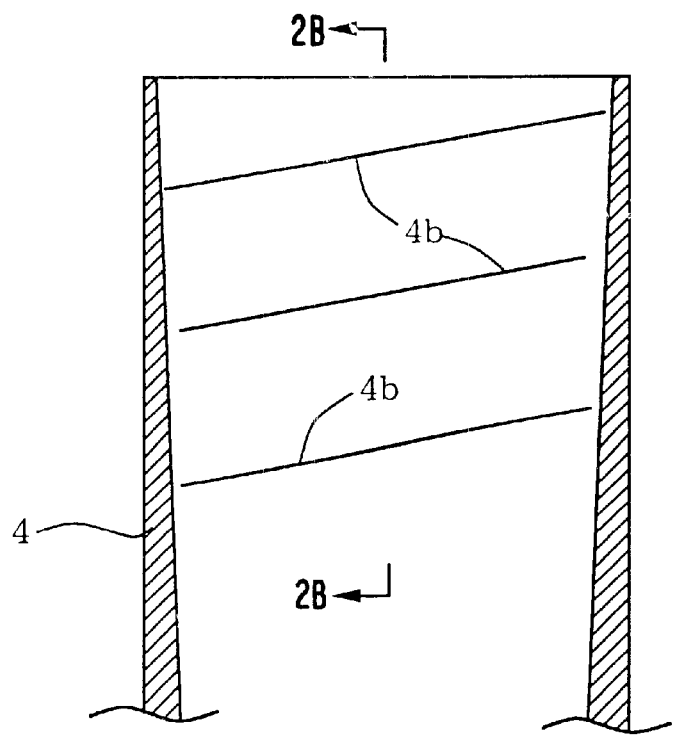
FIG. 2(*a*) is a cross-sectional view of the end of the cylindrical casing of FIG. 1, and (b) is a sectional view along line A—A of (a).
Figure 2B:
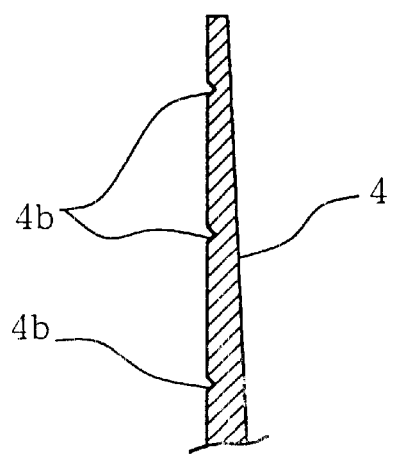
Figure 3A:
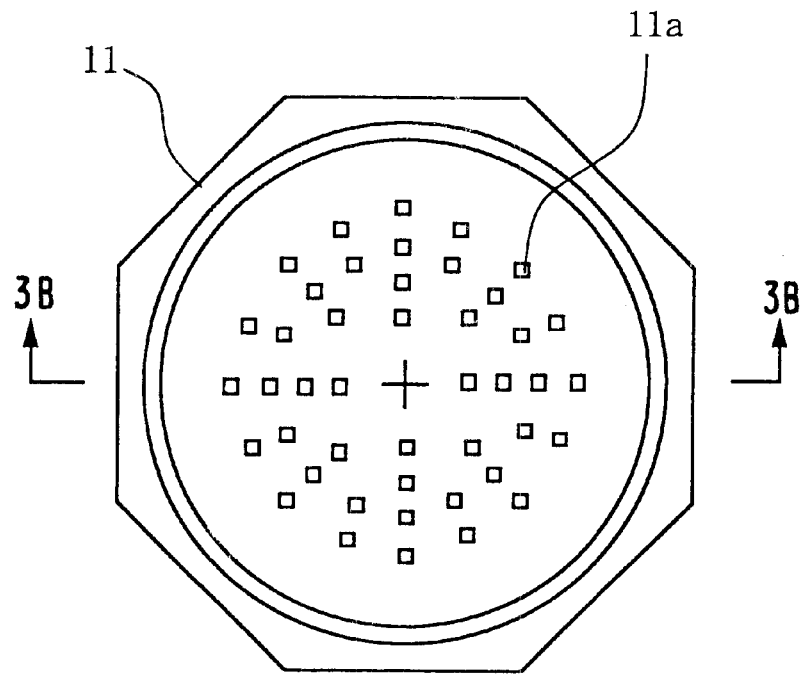
FIG. 3(*a*) is an enlarged side view of the nozzle plate of FIG. 1, and (b) is a sectional view along line B—B of (a).
Figure 3B:
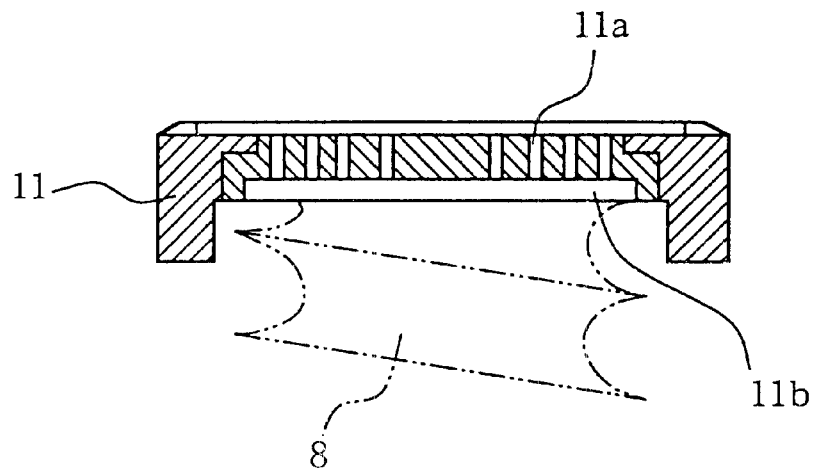
Figure 5:
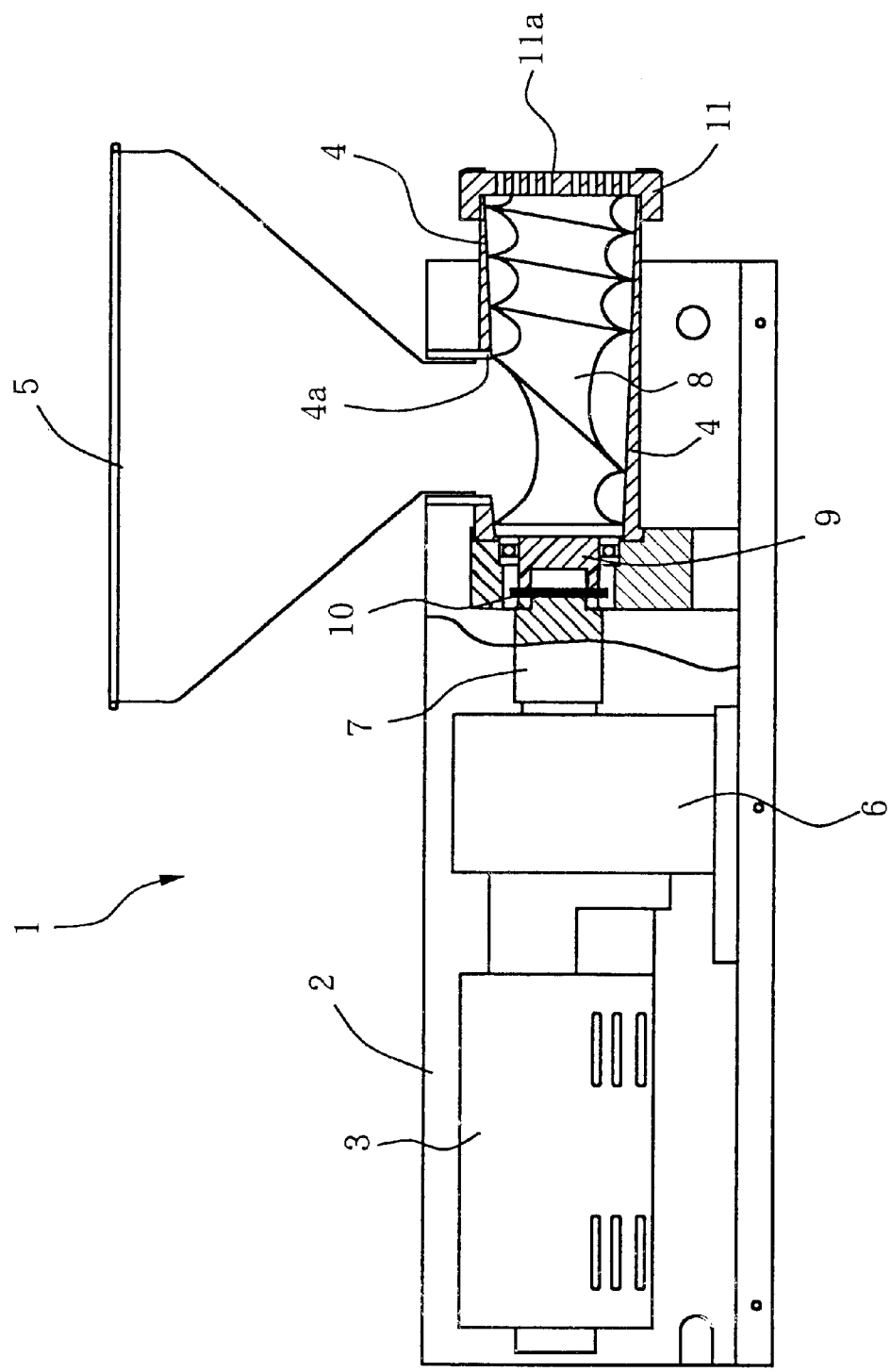
FIG. 5 is a partial cutaway front view of a conventional noodle-making machine.
Figure 6:
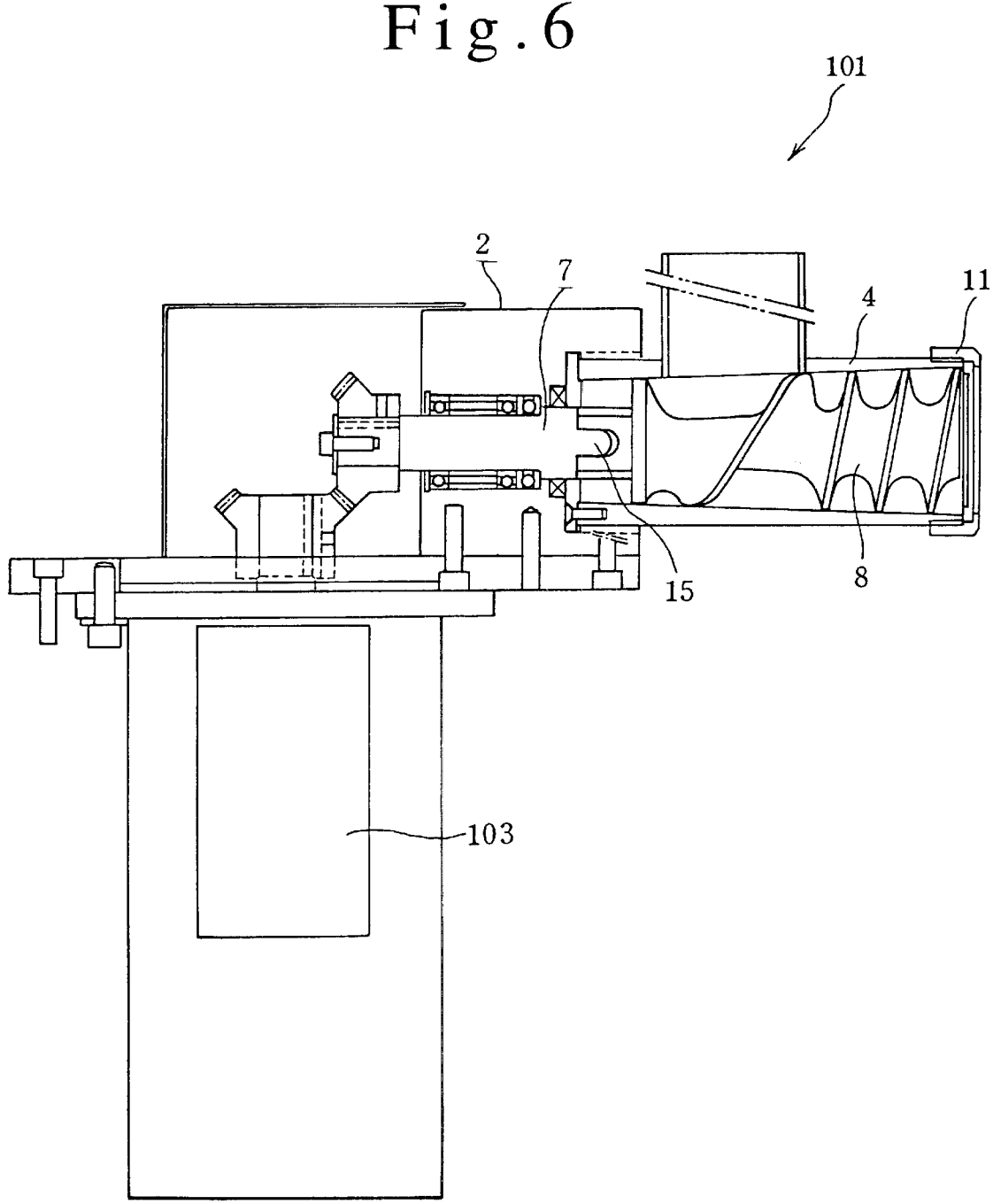
FIG. 6 is a partial cutaway front view of a vertical embodiment of the noodle-making machine of this invention.

Embodiments of the present invention will now be described with reference to the drawings. FIG. 1 is a drawing of an embodiment of the noodle-making machine according to this invention. FIGS. 2, 3 and 4 are drawings showing cross-sectional, enlarged and disassembled perspective views, respectively, of parts of the noodle-making machine of the invention, FIG. 5 is a partial cutaway front view of a conventional noodle-making machine. FIG. 6 shows a vertical embodiment of the noodle-making machine of the invention. The embodiments of the invention will be described based on a comparison between the inventive and conventional noodle-making machines. For this, parts of the conventional and inventive noodle-making machines that are the same have been given the same reference numerals.

A first characteristic of the noodle-making machine 1 is that it has a shallow, spiral-shaped groove 4b formed in the inner surface at the end portion of the cylindrical casing 4. The groove 4b is formed so that the spiral thereof is opposite to that of the screw 8. Thus, when the screw 8 has a right-hand thread the groove 4b has a left-hand spiral, and vice-versa. FIGS. 2(a) and 2(b) show details of the groove 4b. The groove 4b is shallow and narrow, winding one to two times around the inside surface of the cylindrical casing 4 at a pitch that is substantially the same as that of the thread at the end portion of the screw 8. If the groove 4b is too shallow and wide, too much of the starting material being kneaded will enter the groove 4b, preventing that portion from being kneaded.

By means of the groove 4b thus formed, when the pressure applied during the kneading becomes elevated, a portion of the starting material is moved along the groove 4b and over the peak of the screw 8 to the opposite side, which relieves the pressure on the starting material and thereby makes it possible to prevent the temperature from rising and converting the starch of the starting material into soluble starch. The groove 4b is provided for the above function, and therefore is not limited to having an opposite spiral of the same pitch. Instead, the groove 4b may be a straight groove, or spiral in the same direction as the screw 8 at a different pitch thereto. However, a spiral shape makes the groove easier to machine.

Pressure elevation is also prevented by a recessed portion 11b formed in the nozzle plate 11 on the side facing screw 8. FIG. 3 shows the details of the nozzle plate 11. Thus, the recessed portion 11b is formed on the side of the nozzle plate 11 facing the inside of the cylindrical casing 4, providing a space between the end of the screw 8 and the nozzle plate 11. Even when the starting material is subjected to pressure by the rotation of the screw 8, since the blade of the screw 8 does not act directly on material that has entered the recessed portion 11b, it cannot exert pressure directly. Thus, the pressure on the starting material can be relieved. This results in the formation of firm noodles. Because conventional noodle-making machines lack a dwell portion, making firm noodles subjects the entire machine to pressure which increases the load on the joints, causing failure. Moreover, increasing the number of through-holes 11a in the nozzle plate 11 can cause noodles to be extruded too early, resulting in noodles that lack firmness. In accordance with this invention, kneaded starting material is extruded into noodles after evading pressure in the recessed portion 11b, thus enabling noodles to be formed with good firmness.

FIG. 4 shows the coupling between the screw and the motor. A screw-side coupling member 13 has a recessed female portion 13a that extends in a diametrically straight line with respect to the screw. A motor-side coupling member 15 has a corresponding projecting male portion 15a also formed in a diametrically straight line with respect to the motor. The recessed female portion 13a and projecting male portion 15a have mutually complementary shapes with the angles rounded off, so that when coupled together the one fits snugly into the other. The two portions can be readily coupled by hand.

As shown in FIG. 5, in a conventional arrangement a pin is used for the coupling. This pin is therefore subjected to the full force being transmitted by the coupling. The thinness of the pin, being only a fraction of the diameter of the coupling, means it is relatively weak. In contrast, the coupling used in the machine of the present invention, formed by the recessed female portion 13a and the projecting male portion 15a, is able to withstand much more pressure than the pin 10. Moreover, the straight shape of the recessed and projecting portions make them easier to machine, and form a strong, solid coupling for transmitting the rotational force.

The direction of engagement between the recessed female portion 13a and the projecting male portion 15a is along the axis of the screw 8. The inside of the flange of the nozzle plate 11 and the outside of the cylindrical casing 4 each have a thread to allow the nozzle plate 11 to be readily screwed onto the cylindrical casing 4 and unscrewed therefrom. When the nozzle plate 11 is removed, the screw can be drawn out by hand, making it easy to clean the interior of the cylindrical casing 4.

While the coupling has been described with reference to the recessed female portion 13a being on the screw side and the projecting male portion 15a on the motor side, each coupling portion may be on the opposite side. Also, the means of attaching the nozzle plate 11 to the cylindrical casing 4 is not limited to a thread. Instead, any means may be used that enables the plate 11 to be detachably attached to the casing 4.

FIG. 6 is a partially cutaway front view of a vertical type noodle-making machine 101 that is an embodiment of this invention. In the noodle-making machine 101, while the cylindrical casing 4 is disposed horizontally the motor 103 the drives the screw is provided at right-angles to the cylindrical casing 4. In the case of the horizontal type noodle-making machine 1 described in the foregoing, all of the components are disposed horizontally and the noodles formed by the kneaded mixture being pushed through the through-holes 11a of the nozzle plate 11 piles up on a tray placed there for that purpose. This means that the noodle-making machine 1 has to be positioned high enough to secure the space needed to accommodate the noodles collecting below.

The machine is heavy, so such an elevated installation location has to be selected with care, and new shelving or the like might also be required for the installation. In its vertical configuration the noodle-making machine is designed with a space beneath the nozzle plate 11 into which can be placed the tray onto which the extruded noodles descend. In the case of this horizontal type noodle-making machine 101, the motor 103 is disposed vertically. Thus, since the nozzle plate 11 is located elevated away from the flat surface on which the noodle-making machine rests, there is space for the noodle tray to be placed or stored beneath the nozzle plate 11. A bevel gear or the like is used to transmit the rotation of the motor 103 through a 90-degree angle to drive the horizontal screw.

The flavor of soba is said to depend on the quality of the soba flour, the thickening, and the amount of water added. In the case of the noodle-making machine of this invention, ingredients such as the thickening (wheat flour), eggs and grated yam are not required. Instead the noodles can be formed using just pure soba and water. This makes it possible to produce pure soba using the required ratio between the soba flour and the water to provide a desired flavor, such as, for example, 200 cc of water for 500 g of flour. Moreover, since the soba flour is 100% pure, the soba broth also has the genuine soba flavor and also can be savored. Various wild plants, sesame and the like can be mixed in to produce soba with different flavors.

It is possible to automate the whole process by equipping the hopper with a stirrer that automatically stirs soba flour and water placed in the hopper, with the stirred mixture then being automatically fed from the hopper into the machine.

The noodle-making machine of the invention may be used to make noodles in any quantity, small or large. In addition, the machine is structurally simple and easy to operate, enabling even a novice to produce excellent soba. Thus, the machine is suitable for use in the home as well as for commercial use.

While the noodle-making machine of this invention was developed mainly for making soba, the same structure is also applicable to other noodles including udon, macaroni and spaghetti.

As described in the foregoing, the noodle-making machine comprises a cylindrical casing, a screw disposed rotatably inside the cylindrical casing, a nozzle plate provided at the end of the cylindrical casing, said nozzle plate having formed therein numerous small holes, and a hopper attached to the casing. A groove is formed in the inner surface at the end of the casing perpendicularly to the screw. When the noodle starting materials are being kneaded, the entry of the materials into the groove serves to prevent the materials being subjected to too high a pressure. The surface of the nozzle plate in contact with the screw has a recess portion formed therein. The entry of the kneaded material into the recess also serves to lower the pressure being applied to the material, enabling the material to be thoroughly kneaded without the pressure becoming too high.

In the noodle-making machine the screw and motor are joined by a coupling comprising male and female type coupling members with the female side of the coupling being on either the screw or the motor, and the male side of the coupling being on the other side. The projecting male portion fits snugly into the female portion, forming a strong coupling that can withstand high loads imposed by high pressures.

In a vertically configured noodle-making machine, the motor is disposed vertically, making it possible to provide a space between the machine at the nozzle plate end, and the surface on which the machine is installed. This space can be used to accommodate the tray on which the noodles that issue from the machine pile up. This configuration eliminates the need to install the machine on a shelf or the like high off the ground.

What is claimed is:

1. A noodle-making machine comprising a frame, a cylindrical casing disposed in the frame, a screw having a spiral geometry rotatably disposed inside the cylindrical casing, and coaxially aligned with the longitudinal axis of the cylindrical casing, a nozzle plate provided at an end of the cylindrical casing, said nozzle plate having formed therein numerous small holes, motor means mounted in the frame for turning the screw within the cylindrical casing, a hopper attached to the cylindrical casing with the hopper having an opening located between the motor means and the nozzle plate through which flour is fed into the casing under pressure by rotation of the screw, with the screw having spiral threads which spiral in a given direction extending along a section of the cylindrical casing from said hopper to the nozzle plate and wherein said cylindrical casing has an inner surface containing a groove facing the screw with the groove having a spiral geometry, with from one to about three turns which spiral from a location adjacent the end of the opening of the hopper on the side of the hopper opposite the motor extending over a relatively short distance in the direction of the nozzle plate.

2. A noodle making machine according to claim 1, wherein the turns of said groove spiral in a direction opposite to the spiral directions of the screw.

3. A noodle making machine according to claim 1, wherein a surface of the nozzle plate facing the screw has a recessed portion.

4. A noodle making machine according to claim 3, wherein the nozzle plate is detachably connected to the cylindrical casing.

5. A noodle-making machine comprising a frame, a cylindrical casing disposed in the frame, a screw having spiral threads disposed rotatably inside the cylindrical casing, a nozzle plate provided at an end of the cylindrical casing, said nozzle plate having formed therein numerous small holes, and a recessed portion facing the screw, a motor for turning the screw, said motor having a shaft aligned coaxially with said screw, and a coupling that connects the screw to the shaft of the motor, said coupling comprising a male portion extending from said shaft and a recessed female portion coaxially aligned with respect to the screw and the shaft of the motor such that the male portion fits snugly into the female portion to engage said shaft to said motor, a hopper attached to the cylindrical casing with the hopper having an opening located between the motor coupling and the nozzle plate through which flour is fed into the casing under pressure by rotation of the screw, wherein the groove in the casing has a spiral geometry, with from one to about three turns which spiral in a direction opposite to the spiral direction of the screw starting from a location adjacent one end of the hopper on the side opposite the motor coupling and extending over a relatively short distance in the direction of the nozzle plate.

\* \* \* \* \*